(12) United States Patent
Shimizu et al.

(10) Patent No.: US 6,993,980 B2
(45) Date of Patent: Feb. 7, 2006

(54) SURFACE PRESSURE DISTRIBUTION SENSOR AND MANUFACTURING METHOD FOR THE SAME

(75) Inventors: Makoto Shimizu, Ogaki (JP); Masashi Mitsui, Anpachi-gun (JP); Hiroyuki Ueda, Motosu-gun (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 10/448,458

(22) Filed: May 30, 2003

(65) Prior Publication Data
US 2004/0049363 A1 Mar. 11, 2004

(30) Foreign Application Priority Data
May 31, 2002 (JP) ............................. 2002-160258
May 31, 2002 (JP) ............................. 2002-160259
May 31, 2002 (JP) ............................. 2002-160260
May 31, 2002 (JP) ............................. 2002-160261
May 31, 2002 (JP) ............................. 2002-160262
May 31, 2002 (JP) ............................. 2002-160263

(51) Int. Cl.
G01D 7/00 (2006.01)
(52) U.S. Cl. ................................. 73/862.046
(58) Field of Classification Search ........... 73/862.046, 73/777; 382/124, 125

See application file for complete search history.

(56) References Cited

U.S. PATENT DOCUMENTS

| 4,644,801 A | * | 2/1987 | Kustanovich ........... 73/862.046 |
| 5,010,774 A | * | 4/1991 | Kikuo et al. ............ 73/862.046 |
| 5,400,662 A |   | 3/1995 | Tamori |
| 5,429,006 A |   | 7/1995 | Tamori |
| 5,503,029 A |   | 4/1996 | Tamori |
| 5,515,738 A | * | 5/1996 | Tamori ..................... 73/862.46 |
| 5,559,504 A |   | 9/1996 | Itsumi et al. |
| 5,745,046 A |   | 4/1998 | Itsumi et al. |
| 6,052,475 A | * | 4/2000 | Upton ......................... 382/125 |
| 6,267,014 B1 | * | 7/2001 | Gagnon ................. 73/862.046 |
| 6,321,605 B1 | * | 11/2001 | Gagnon ................. 73/862.046 |
| 6,633,656 B1 | * | 10/2003 | Picard ......................... 382/124 |
| 6,661,019 B2 | * | 12/2003 | Furusato et al. ............. 250/556 |
| 6,862,942 B2 | * | 3/2005 | Kawahata ............... 73/862.046 |

FOREIGN PATENT DOCUMENTS
JP 07-168930 7/1995

* cited by examiner

Primary Examiner—Edward Lefkowitz
Assistant Examiner—Andre Allen
(74) Attorney, Agent, or Firm—Morrison & Foerster LLP

(57) ABSTRACT

In view of conventional circumstances where a surface pressure distribution sensor has poor reproducibility when mass-produced, so it has been desired to stabilize sensing properties, to secure reliability, and to improve productivity and yield, the invention achieves stabilizing sensing properties, securing reliability, and improving productivity and yield by optimizing the size of the flow barrier provided inside the sealing agent and the gap, the material and location of the contact, and the tension of the common electrode film.

10 Claims, 10 Drawing Sheets

United States Patent US 6,993,980 B2

SURFACE PRESSURE DISTRIBUTION SENSOR AND MANUFACTURING METHOD FOR THE SAME

BACKGROUND OF THE INVENTION

1. Field of the Invention

This invention relates to a surface pressure distribution sensor which is suitable for detecting microscopic asperity patterns such as fingerprint patterns by using a flexible conductive film, and also relates to a manufacturing method of such a sensor.

2. Description of the Related Art

FIGS. 14A–14B show an example of an active matrix surface pressure distribution sensor for detecting fingerprint patterns. FIG. 14A is a plan view of the device, and FIG. 14B and FIG. 14C are cross sectional views taken along line D—D shown in FIG. 14A.

A conventional sensor 200 for surface pressure distribution includes a substrate 201 which is made of a glass, a ceramic or the like, and a common electrode film 202. The device also has a number of TFTs (thin film transistors) 204a thereon as unit detection elements.

Each of the unit detection elements 204 includes TFT 204a and contact electrode connected thereto. The unit detection elements 204 are arranged in the form of a matrix on the substrate 201. The active layers of the TFTs of the unit detection elements 204 are made of an amorphous silicon film. The contact electrodes 204b are made of ITO (indium tin oxide).

The common electrode film 202 is provided so as to face the substrate 201, and includes a flexible insulator film 202a and a conductive film 202b deposited on the rear side of the film 202a (TFT side). The common electrode film 202 is fixed on a sealing agent 203 applied around the substrate 201 so as not to be in contact with the substrate 201.

An example of a manufacturing method of this surface pressure distribution sensor will be described. After the TFTs are formed on the substrate 201, the sealing agent 203 made of a low temperature thermosetting resin is applied around the substrate 201 in order to affix the common electrode film 202 thereon. The common electrode film 202 is then affixed on the substrate 201 and subjected to a heat treatment. Consequently, the substrate 201 and the common electrode film 202 are fixed to each other.

FIG. 14C shows an example of detecting fingerprint patterns by using this surface pressure distribution sensor. By placing a finger F to press slightly the top of the sensor 200, the common electrode film 202 as a whole is pressed down. However, the difference in pressure between the peaks and the valleys of the fingerprint pattern causes only the contact electrodes 204b of the unit detection elements 204 directly below and in the vicinity of the peaks to come into electrical contact with the common electrode film 202. On the other hand, the contact electrodes 204b of the unit detection elements 204 directly below and in the vicinity of the valleys of the fingerprint pattern are not in electrical contact with the common electrode film 202. Hence, the signals corresponding to the regions in which the common electrode film 202 and the unit detection elements 204 come into contact with each other are generated so as to detect fingerprint patterns.

It is known that a surface pressure distribution sensor with TFTs can be realized by the above-mentioned structure and manufacturing method. However, the reproducibility of such devices is poor when mass-produced.

SUMMARY OF THE INVENTION

The invention provides a surface pressure distribution sensor that includes a substrate unit detection elements disposed on the substrate, a flexible conductive film disposed over the substrate so that the distance between the flexible conductive film and the substrate is between 15 $\mu$m and 40 $\mu$m, and a sealing agent attaching the flexible conductive film to the substrate.

The invention also provides a manufacturing method of a surface pressure distribution sensor. The method includes forming unit detection elements on a substrate, forming a flow barrier at a peripheral portion of the substrate, applying a sealing agent containing resin fibers or spherical spacers having a diameter of 15 $\mu$m to 40 $\mu$m on the substrate at a portion outside the flow barrier, placing a flexible conductive film on the sealing agent to cover the substrate, and applying a pressure to the sealing agent so that the distance between the flexible conductive film and the substrate is determined by the diameter of the resin fibers or the spherical spacers.

The invention further provides a surface pressure distribution sensor that includes a substrate, unit detection elements disposed on the substrate, a sealing agent disposed on the substrate and surrounding the unit detection elements, a flexible conductive film attached to the sealing agent and covering the substrate, and a flow barrier disposed on the substrate on the inner side of the sealing agent.

The invention also provides a manufacturing method of a surface pressure distribution sensor. The method includes forming unit detection elements on a substrate, applying a thermosetting resin on the substrate so that the thermosetting resin surrounds the unit detection elements, performing a first heat treatment on the thermosetting resin so as to form a flow barrier, applying a sealing agent on the substrate at a portion outside the flow barrier, placing a flexible conductive film on the sealing agent to cover the substrate, and performing a second heat treatment so as to attach the flexible conductive film to the substrate.

The invention further provides a surface pressure distribution sensor that includes a substrate, unit detection elements disposed on the substrate, a sealing agent disposed on the substrate and surrounding the unit detection elements, a flexible conductive film attached to the sealing agent and covering the substrate, and a hermetically sealed structure defined by the substrate, the flexible conductive film and the sealing agent and containing a gas.

The invention also provides a manufacturing method of a surface pressure distribution sensor. The method includes forming unit detection elements on a substrate, applying a sealing agent on the substrate so as to surround the unit detection elements, and attaching in an atmosphere of an inert gas a flexible conductive film to the substrate using the sealing agent so as to seal the unit detection elements hermetically.

The invention further provides a manufacturing method of a surface pressure distribution sensor. The method includes forming unit detection elements on a substrate, applying a sealing agent on the substrate, placing a flexible conductive film on the sealing agent so as to cover the substrate, applying a pressure to the sealing agent by rolling a roller on the flexible conductive film, and performing a heat treatment to harden the sealing agent.

The invention also provides a manufacturing method of a surface pressure distribution sensor. The method includes forming unit detection elements on a substrate, applying a sealing agent on the substrate so as to surround the unit detection elements, placing a flexible conductive film on the sealing agent so as to cover the substrate, performing a first heat treatment so as to harden the sealing agent and attach the flexible conductive film to the substrate, and performing a second heat treatment to shrink the flexible conductive film attached to the substrate.

The invention further provides a surface pressure distribution sensor that includes a substrate, unit detection elements disposed on the substrate, a flexible conductive film disposed over the substrate, a sealing agent attaching the flexible conductive film to the substrate, and a contact for an electrical connection of the flexible conductive film. The contact includes a thermosetting resin and conductive particles mixed in the thermosetting resin.

The invention also provides a manufacturing method of a surface pressure distribution sensor. The method includes forming unit detection elements and a contact pad on a substrate, forming a flow barrier on the substrate so as to surround the unit detection elements, applying a sealing agent on the substrate at a portion outside the flow barrier, applying a contact resin containing conductive particles on the contact pad, placing a flexible conductive film on the sealing agent and the contact resin to cover the substrate, and performing a heat treatment so that the flexible conductive film is attached to the substrate with the sealing agent and is electrically in contact with the contact pad.

DETAILED DESCRIPTION OF THE INVENTION

Figure 1:
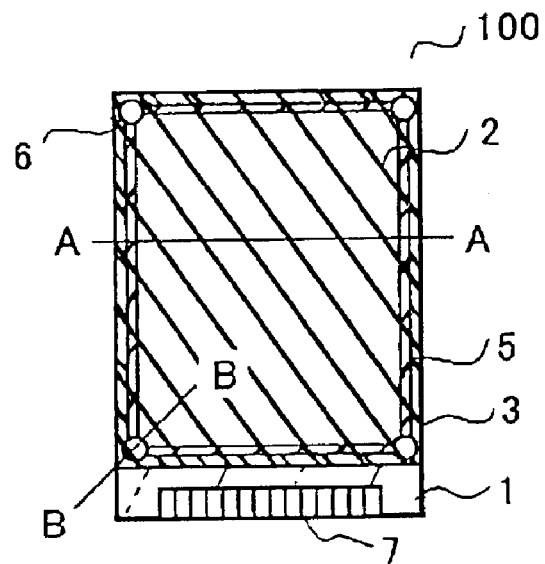
FIG. 1 is a plan view a surface pressure distribution sensor of an embodiment of this invention.
Figure 2:
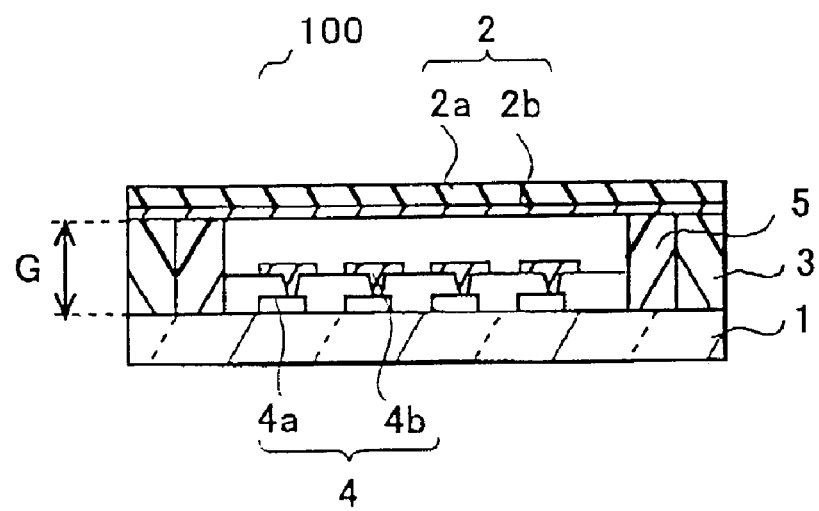
FIG. 2 is a cross sectional view of the sensor of FIG. 1.
Figure 3:
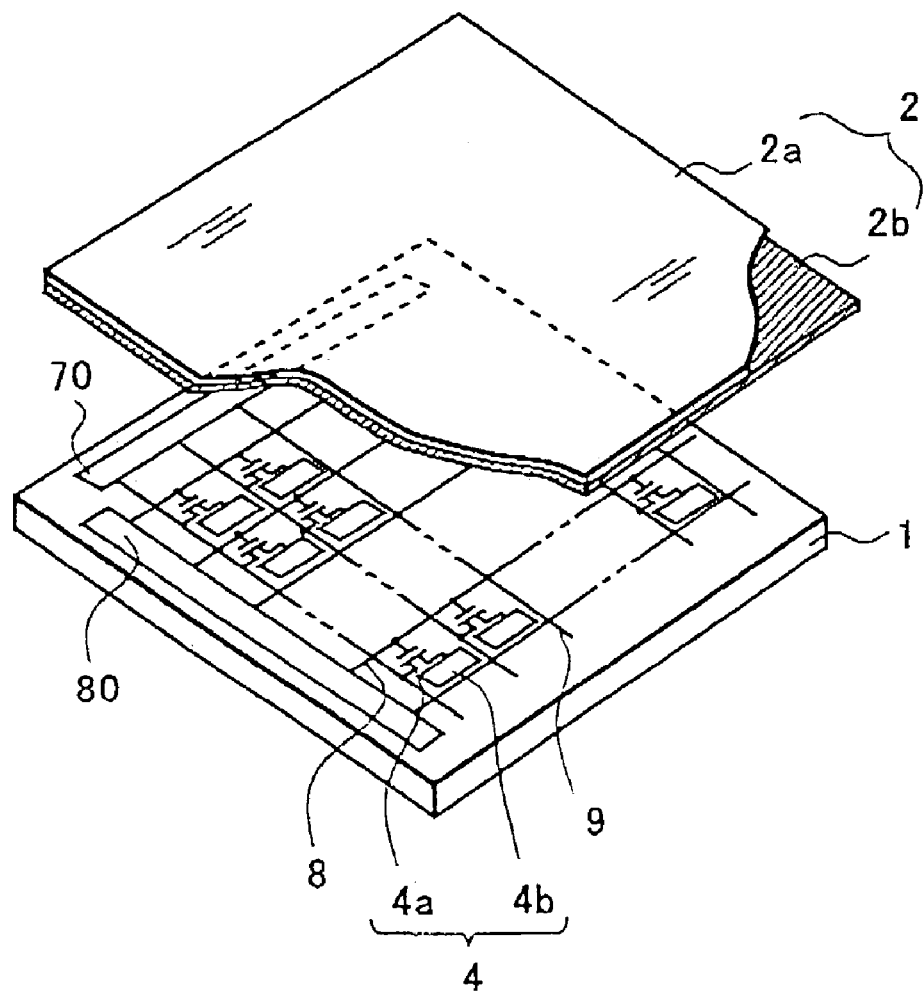
FIG. 3 is an exploded perspective view of the sensor of FIG. 1.

An embodiment of this invention will be described in detail referring to FIGS. 1–13. FIG. 1 through FIG. 3 show the structure of a surface pressure distribution sensor 100 of this embodiment. FIG. 1 is a plan view of this device, FIG. 2 is a cross sectional view taken along line A—A of FIG. 1, and FIG. 3 is an exploded perspective view.

The surface pressure distribution sensor 100 has a structure in which a substrate 1 and a common electrode film 2 made of a flexible conductive film are fixed to each other by a sealing agent 3. Inside the sealing agent 3 on the substrate 1 are arranged a number of unit detection elements 4 in the form of a matrix. A flow barrier 5 is disposed along the inner surface of the sealing agent 3, and a contact 6 is disposed between the sealing agent 3 and the flow barrier 5. An external contact terminal 7 is placed on one side of the substrate 1.

The substrate 1, which is made of a glass in this embodiment, may be another insulator substrate made of quartz, a ceramic, a plastic or the like, or may be a semiconductor substrate.

The common electrode film 2 has a structure in which a metallic conductive film 2b made of a metal such as gold is deposited on the rear side (TFT side) of a flexible insulator film 2a made of PET (polyethylene terephthalate), PEN (polyethylenenaphthalate) or the like. The sealing agent 3 is thermosetting resin which is a fluid before being set and is hardened by a heat treatment.

Each of the unit detection elements 4 includes a TFT 4a, which is a switching element, and a contact electrode 4b connected thereto. The active layers of the TFTs 4a are silicon film, and preferably are polysilicon film. In this embodiment, the switching elements are TFTs. However, other switching elements may be used. For example, when the substrate 1 is a semiconductor substrate, they may be transistors employing the semiconductor substrate 1 as an active layer. Furthermore, they may be thin film diodes. The contact electrodes 4b are a conductive film that is formed on the insulator film covering the TFTs 4a, and is made of, for example, ITO.

The flow barrier 5 is made of the same thermosetting resin as the sealing agent 3. The contact 6 is provided to supply the common electrode film 2 with a GND (ground) potential, and is disposed between the sealing agent 3 and the flow barrier 5. The contact 6 includes a contact pad 6a made of Al and an overlying contact resin 6b made of a thermosetting resin containing Au pearl, or fillers made of Au. The external terminal 7 is connected with an external circuit via a FPC (Flexible Printed Circuit), which is not shown in the figure.

As shown in FIG. 3, gate lines 8 and drain lines 9 are arranged in the form of a matrix on the substrate 1. The gate lines 8 are provided with gate signals, and the drain lines 9 are provided with scanning signals. The TFTs 4a are located at the intersections of the gate lines 8 and the drain lines 9. Gate electrodes are connected with the gate lines 8, drain terminals are connected with the drain lines 9, and source terminals are connected with the contact electrodes 4b. Interconnections (not shown), which transmit various kinds of signals to be inputted to the gate lines 8 and the drain lines 9, are placed on one side edge of the substrate 1 and connected to the external connection terminal 7.

Figure 4A:
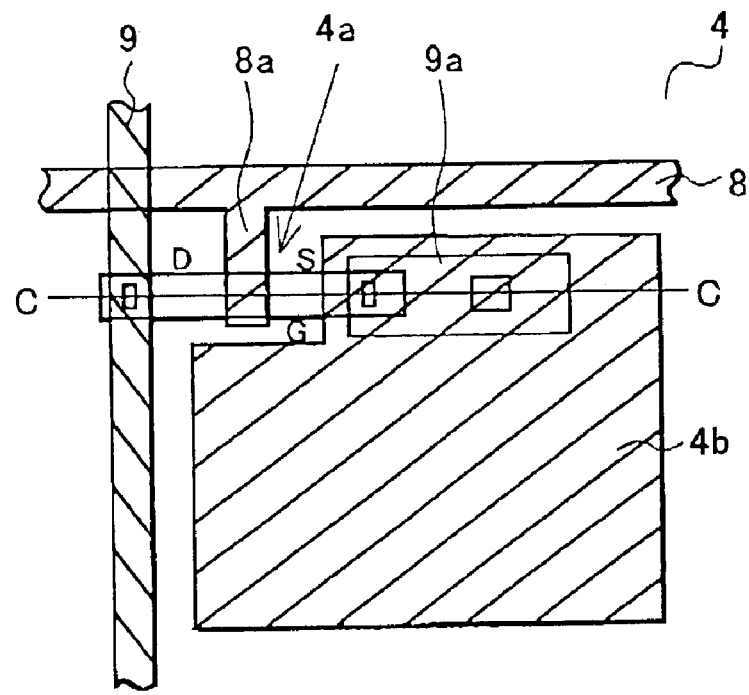
FIG. 4A is a plan view of a unit detection element of the sensor of FIG. 1.
Figure 4B:
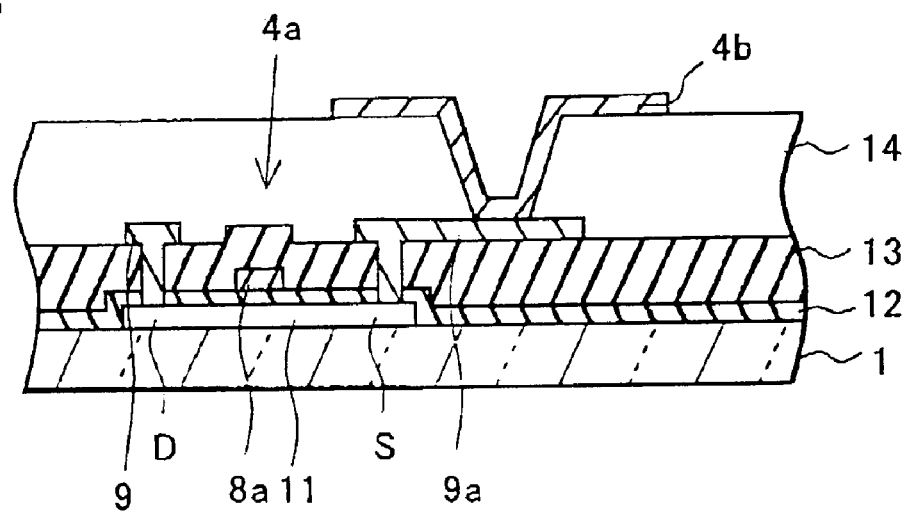
FIG. 4B is a cross sectional view of the unit detection element.

The unit detection elements 4 will be described in detail as follows with reference to FIGS. 4A and 4B. FIG. 4A is a plan view of one of the unit detection elements 4, and FIG. 4B is a cross sectional view taken along line C—C of FIG. 4A. The same reference numerals as those in FIG. 1 indicate the same components.

The TFT 4a of the unit detection element 4 includes an active layer 11 of polysilicon on the substrate 1. The active layer 11 includes a source region S and a drain region D, which have impurities introduced by a well-known method.

A gate insulator film 12 is formed on the entire surface of the active layer 11, and a gate electrode 8a is formed on the gate insulator film 12. The gate electrode 8a is formed integrally with the gate line 8. An interlayer insulator film 13 is formed on the gate electrode 8a. The drain terminal D and the source terminal S on the active layer 11 are connected with the drain line 9 and with an extension electrode 9a, respectively, via respective contact holes. The extension electrode 9a is part of the same wiring layer as the drain line 9, and is made of Al. A planarization film 14 is further laminated thereon to planarize the underlying layer. On the planarization film 14 is provided the contact electrode 4b made of ITO, which is in contact with the extension electrode 9a via a contact hole.

Figure 5A:
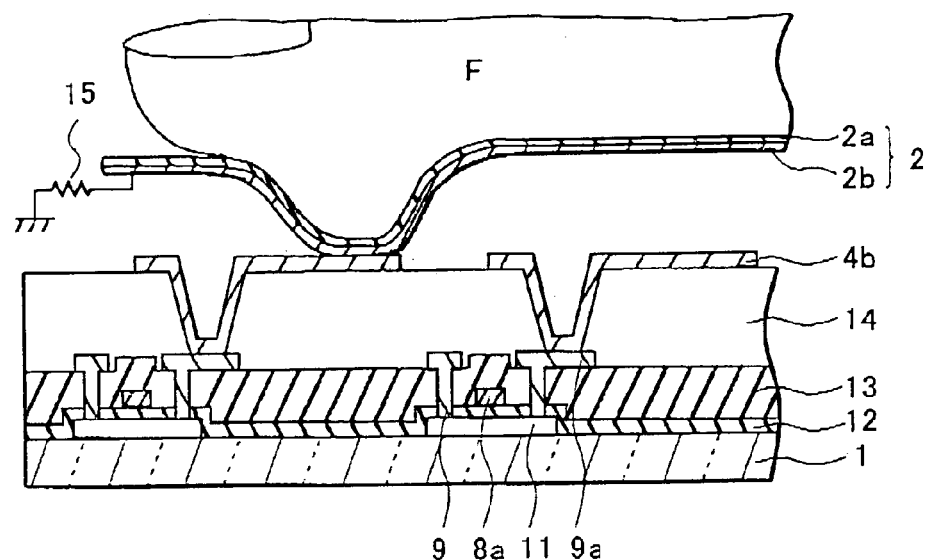
FIG. 5A is a cross sectional view of the sensor of FIG. 1 when a finger touches the sensor.
Figure 5B:
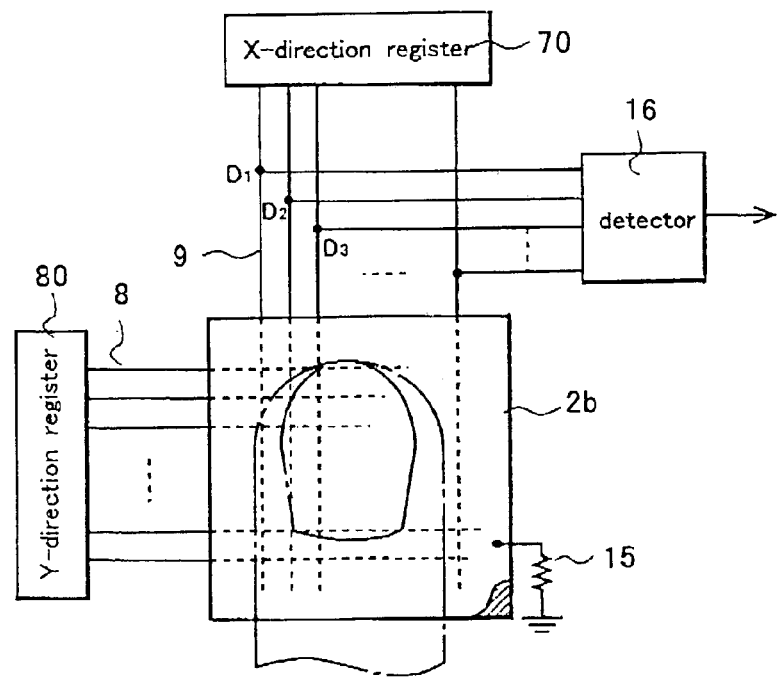
FIG. 5B is an operating circuit of the sensor of FIG. 1.

The operation of the surface pressure distribution sensor 100 of this embodiment will be described with reference to FIGS. 5A and 5B. FIG. 5A schematically shows finger F put on the surface pressure distribution sensor 100, and FIG. 5B is a conceptual circuit diagram of the surface pressure distribution sensor 100.

Finger F presses the top surface of the surface pressure distribution sensor 100, the common electrode film 2 as a whole is pressed down, as exaggeratedly shown in FIG. 5A. As shown in the figure, the peaks of the fingerprint pattern of finger F push the common electrode film 2 down directly below and in the vicinity of the peaks. On the other hand, the valleys of the fingerprint pattern fail to push down the corresponding portion of the common electrode film 2. Consequently, the contact electrodes 4b of the unit detection elements 4 corresponding to the peaks come into contact with the conductive film 2b of the common electrode film 2, whereas the contact electrodes 4b of the unit detection elements 4 corresponding to the valleys are remain apart from the conductive film 2b.

The conductive film 2b of the common electrode film 2 is grounded via a resistance 15. The drain lines 9 of the surface pressure distribution sensor 100 are connected with an X-direction register 70, and the gate lines 8 are connected with a Y-direction register 80. The Y-direction register 80 outputs scanning signals sequentially to the gate lines 8 by switching the lines 8 at a predetermined timing. Assume that a certain gate line 8 is applied with a gate signal of a certain potential ("H" level). The TFTs 4a connected to the gate line 8 applied with the gate signal are all turned on. Meanwhile, the X-direction register 70 applies scanning signals sequentially to the drain lines 9 by switching the lines 9 at a predetermined timing.

When the common electrode film 2 is pushed down by the peaks of the fingerprints of finger F and comes into contact with the contact electrodes 4b, the voltages as scanning signals increase for a short time, but decrease again since a current goes out via the TFTs 4a and the resistance 15. When the common electrode film 2 is not in contact with the contact electrodes 4b in the valleys of the fingerprints of the finger F, the voltages of the scanning signals are maintained without a decrease. By reading them as voltage signals by a detector 16, a surface pressure distribution corresponding to one line can be measured. Then, the surface pressure distribution of the entire surface can be measured by sequentially switching the gate lines 8 to apply gate signals, and by reading the signals from all the unit detection elements 4 in the surface pressure distribution sensor 100.

The detector 16 is a voltage measuring device branched from the drain lines 9 in this embodiment because it has a simple circuit configuration, or may be a current measuring device inserted in series to the drain lines 9.

Figure 6A:
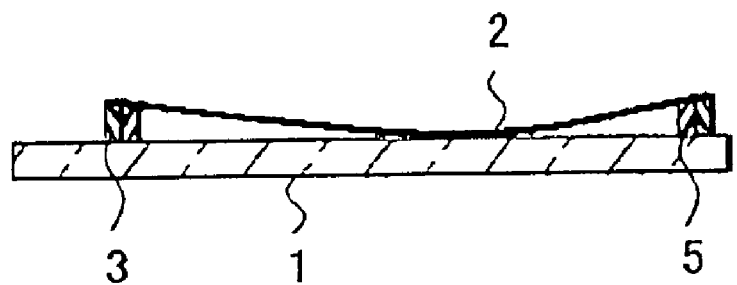
FIGS. 6A and 6B are cross sectional views to show the variation of the separation distance of the sensor of FIG. 1.
Figure 6B:
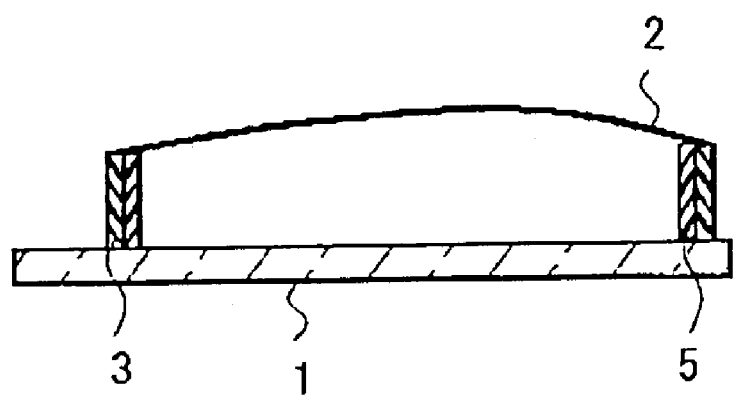

The design consideration on the gap G in FIG. 2 between the substrate 1 and the common electrode film 2 will be described with reference to FIGS. 6A and 6B. When the gap G is 10 μm or less, there may be problems because the gap may be too small. When the common electrode film 2 is affixed, it is highly likely that the film 2 contacts the substrate 1 in the center at this small gap, as shown in FIG. 6A. In addition the amount of air sealed in the device may vary significantly with this small gap, which results in variations in sensitivity. Dry air or an inert gas may also be sealed in this cavity. In contrast, when the gap G is 40 μm or larger, as shown in FIG. 6B, the amount of air sealed inside the device is so large that the common electrode film 2 may not be pressed down properly by a finger to contact the unit detection elements 4, thereby adversely effecting the sensitivity. Consequently, the gap G of 10 μm to 40 μm is preferable. The sensitivity of the sensor is high when the gap G is small since fingerprints are detected with a minimal touch of a finger, and the variations in the sensitivity are small when the gap G is large. When the common electrode film 2, which is made of a flexible film, is under a low tension, the film is in constant contact with the unit detection elements 4 even when it is not pressed down by the finger F, making the sensor defective. If the film 2 is in constant contact with the elements 4 within only a small area (which is referred to as slight contact), with the touch of the finger F the common electrode film 2 is bent along the curve of the touching finger F without causing any problem in sensing the fingerprints. However, the pressure is detected even after the finger F is removed, because a certain portions of the common electrode film 2 remains in contact with the unit detection elements, thereby causing a problem in the quality of the product. This slight contact occurs often when the gap G is around 10 μm. Hence, it is preferable to set the gap G at 15 μm or larger. In this embodiment, the optimal value is set at 25 μm.

Here, the distance 25 μm of the gap G is somewhat large as compared with, for example, the distance of 6 μm to 7 μm between the substrates in an LCD (liquid crystal display) device. In general, in the case of an LCD, a spherical spacer, called micro pearl, is sprayed on the entire surface between the substrates in order to make the spacing between the substrates uniform. However, in the surface pressure distribution sensor 100 of this embodiment, it is impossible to spray the spacer because the common electrode film 2 and the unit detection elements 4 must come to a mutual contact.

Because of this inability to use the spacer, the gap G must be secured by the sealing agent 3. Thus, in this embodiment, pillar-like resin fibers with a diameter of 25 μm and a length of 45 μm to 50 μm are mixed into the sealing agent 3 so as to maintain the predetermined gap G. The resin fibers, which are manufactured by a different method from the spherical spacers, are suitable for this sensor because of its accurate control in the diameter, i.e., 25 μm±0.3 μm. Glass fibers may also be used. Furthermore, a spherical spacer having a diameter of about 25 μm may also be used, replacing the fibers. When the sensitivity is considered as priority over the adhesion or slight contact issues, the gap G may be between 10 μm and 15 μm. In this case, the diameter of the resin fiber, the glass fiber or the spherical spacer employed is between 10 μm and 15 μm.

A manufacturing method of the surface pressure distribution sensor 100 of this embodiment will be described, with reference to FIG. 7 through FIG. 10.

Figure 7A:
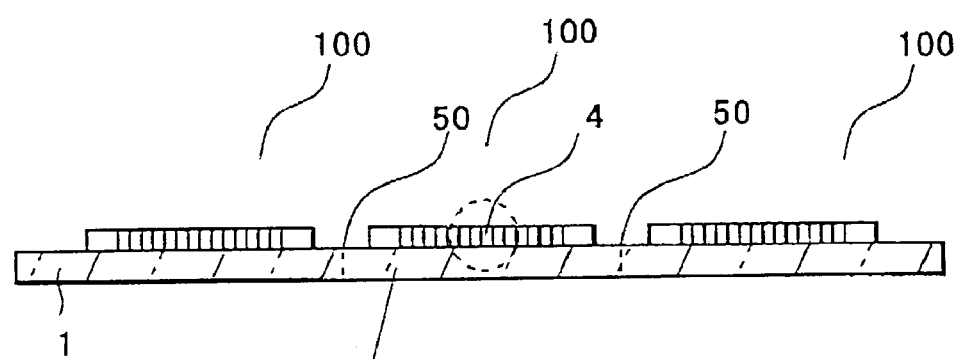
FIG. 7A is a cross sectional view of the sensor of FIG. 1 formed on a mother glass.
Figure 7B:
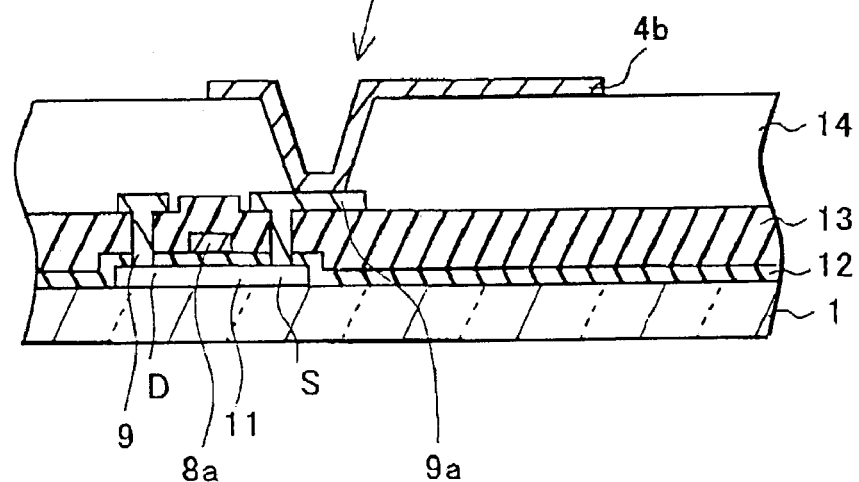
FIG. 7B is a partially expanded view of FIG. 7A.

FIG. 7A shows a plurality of the surface pressure distribution sensors 100 formed on a mother glass 1 prior to the attachment of the common electrode film 2, and FIG. 7B is a cross sectional view of one of the unit detection elements.

Figure 12A:
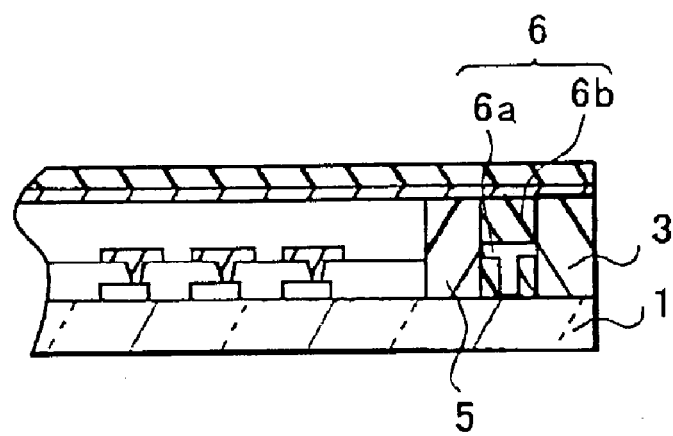
FIGS. 12A and 12B are cross sectional views to show a contact pad and related structures of the sensor of FIG. 1.
Figure 12B:
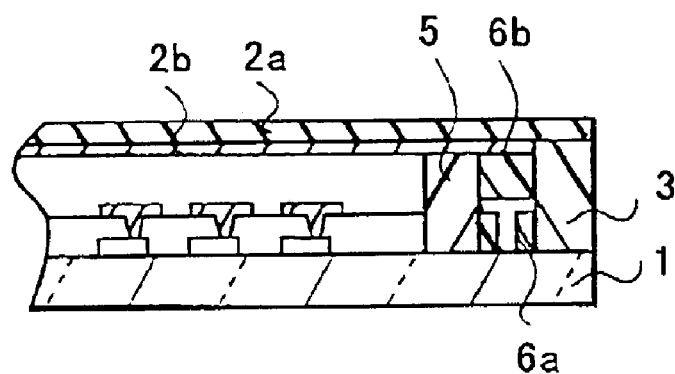

Forming a plurality of surface pressure distribution sensors 100 on one sheet of the mother glass can reduce the manufacturing cost of the surface pressure distribution sensors. First, a buffer layer (not shown) having a silicon oxide film and a silicon nitride film is formed on the mother glass 1. Then, an amorphous silicon film is deposited and crystallized by laser annealing so as to form a polysilicon film. Next, the gate insulator film 12 is formed and a metallic film made of chrome is formed and etched so as to form the gate line 8. The gate electrode 8a is connected to the line and the external connection terminal 7 (not shown). While utilizing the gate electrode 8a as a mask, impurities are introduced by a well-known method to form the source region S and the drain region D, thereby forming the active layer 11. Then, the interlayer insulator film 13 is formed, and contact holes are formed at predetermined positions, and the drain line 9, extension electrode 9a, and contact pad 6a around the substrate (not shown in FIG. 7) are formed. The contact pad 6a is provided by creating an opening in the interlayer insulator film 13 at the corners of the substrate 1. The contact 6 includes the contact pad 6a and the contact resin 6b, and supplies the common electrode film 2 with a GND potential, as shown in FIGS. 12A and 12B. Furthermore, the contact electrode 4b is formed so as to form a number of unit detection elements 4 on the substrate 1. Subsequently, the large substrate 1 is cut along scribe lines 50 so as to divide the mother substrate 1 into individual substrates 1, which are used as individual surface pressure distribution sensors.

Figure 8:
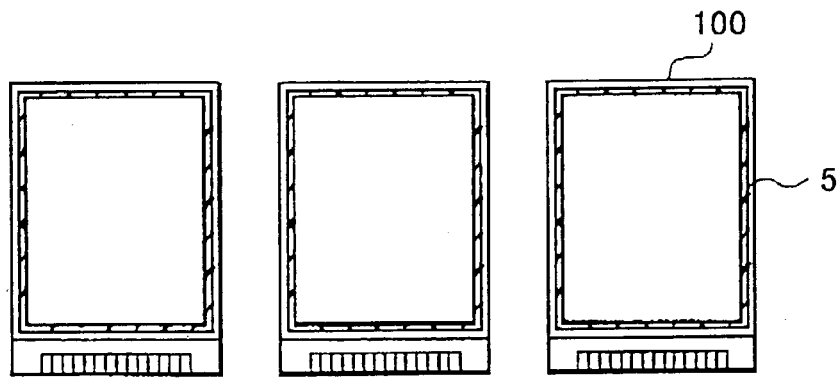
FIG. 8 is a plan view to show a process step of manufacturing the sensor of FIG. 1.

As shown in FIG. 8, a thermosetting resin is applied only on its peripheral portion to form a frame around the substrate 1. Note that the resin frame leaves a predetermined distance from the edge of the substrate 1. Then, a heat treatment is carried out at 70° C. for 20 minutes to form the flow barrier 5, which is semi-hardened. Hereinafter, this heat treatment for the formation of the flow barrier 5 is referred to as pre-baking. The term "semi-hardening" indicates that the viscosity of the resin after the semi-hardening becomes at least twice as much as the initial viscosity of the resin, which is about 100 Pa·s. In the semi-hardened state, the resin does not flow driven by a capillary force.

Figure 9:
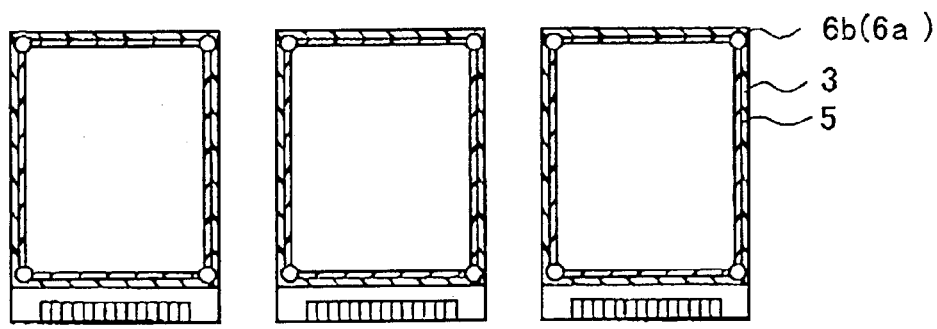
FIG. 9 is a plan view to show a process step of manufacturing the sensor of FIG. 1 following the step of FIG. 8.

As shown in FIG. 9, the sealing agent 3 containing resin fibers or the like with a diameter of 25 $\mu$m is applied on the substrate 1 outside the flow barrier 5. Furthermore, in order to form the contact 6, the thermosetting resin containing metallic balls is potted on the contact pad 6a provided outside the flow barrier 5. The metallic balls may be Au pearl with a uniform particle size (AU-230, with a diameter of 30 $\mu$m, manufactured by Sekisui Chemical Co., Ltd.). The Au pearl is a powder having uniform spherical resin particles coated with Au. If the contact 6 is made of a Ag paste, the ITO may deteriorate because Ag powders are sharp in shape and have variations in diameter. In contrast, Au pearl does not cause such deterioration. In addition, the use of Au pearl can decrease resistance, making it possible to reduce the resistance of the contact 6 even with a small area. As the resin for the base material of the contact 6 and the sealing agent 3, a low temperature thermosetting resin is used.

Figure 10:
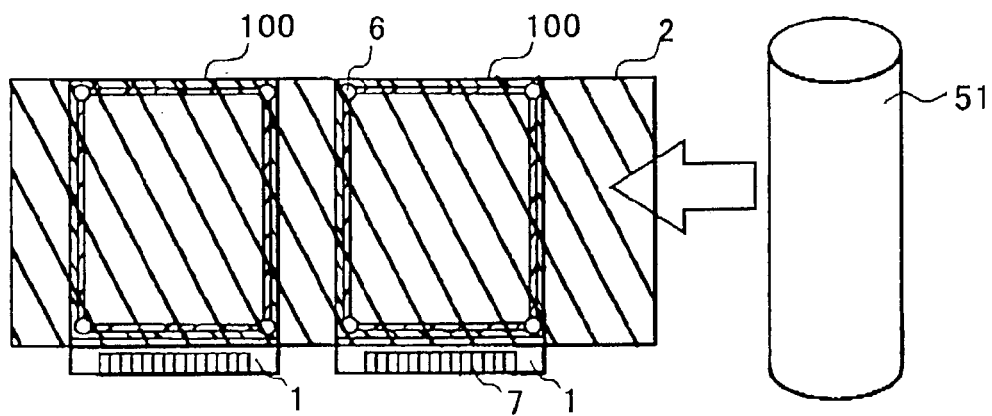
FIG. 10 is a plan view to show a process step of manufacturing the sensor of FIG. 1 following the step of FIG. 9.

As shown in FIG. 10, in an atmosphere of nitrogen without moisture, a plurality of substrates 1 are aligned in one direction, and the common electrode film 2 which is long in that direction is placed on the substrates 1 in such a manner that the external connection terminals 7 are excluded. In addition, the process steps of this embodiment may be performed in air or an atmosphere of a inert gas. A roller 51 is rolled on the common electrode film 2 so as to affix the film 2 onto the plurality of substrates 1. The use of the common electrode film 2 which is long in one direction enables the long common electrode film 2 to be pressed while giving it an appropriate tension. The application of pressure by the roller 51 releases excess air from between the substrates 1 and the common electrode film 2. Then, under a load, a heat treatment is carried out for 30 minutes at 90° C., at which the low temperature thermosetting resin of the sealing agent 3 is fully hardened so as to harden the contact resin 6b and the resin of the sealing agent 3. Thus, the common electrode film 2 is fixed on the substrates 1, and at the same time, the contact 6 is formed to connect the contact pad 6a and the common electrode film 2. In addition, the flow barrier 5 is also fully hardened into a shrunk form with a reduced height. This heat treatment is referred to as main baking. In this case, the gap G between the substrates 1 and the common electrode film 2 is optimized in accordance with the diameter of the resin fiber or the like during the main baking under the load. In this embodiment the gap G is 25 $\mu$m. Finally, the common electrode film is divided into individual pieces corresponding to the substrates 1, thereby completing the surface pressure distribution sensors 100. The reason for employing the low temperature thermosetting resin as the sealing agent 3 and the contact 6 is that the heat-resistant temperature (softening temperature) of PET used as the flexible insulator film 2a of the common electrode film 2 is approximately 120° C. and it is impossible to carry out a heat treatment above this temperature.

Figure 11A:
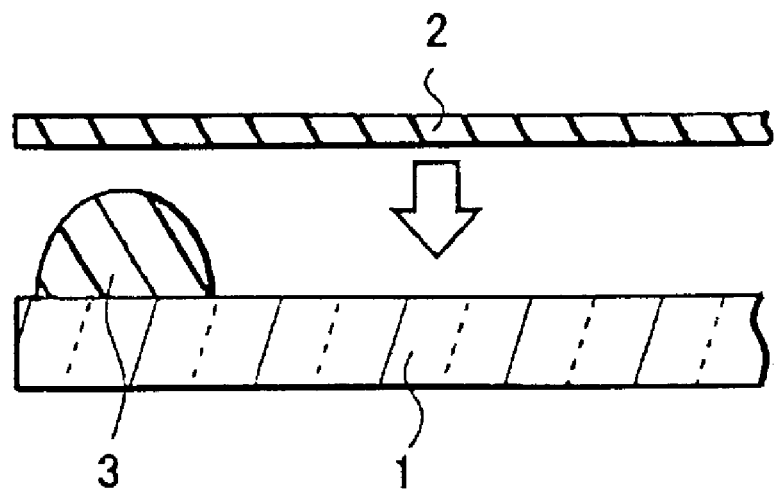
FIGS. 11A and 11B are cross sectional views to show a defect formation without the use of a flow barrier.
Figure 11B:
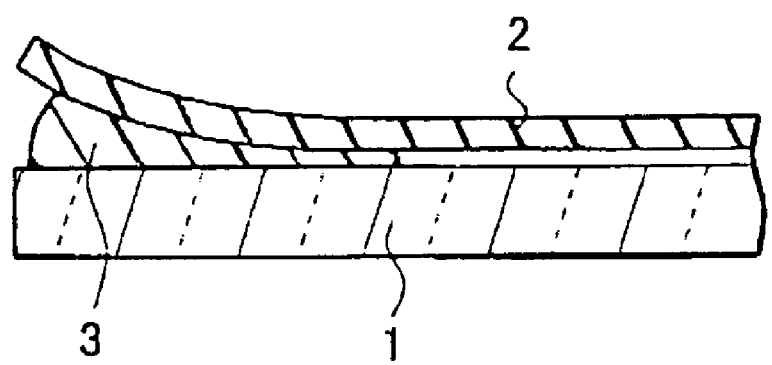

The following is a description of the flow barrier 5. In general, the flow barrier 5 is not provided in an LCD, and both substrates are fixed with the sealing agent 3 only. However, since the surface pressure distribution sensor requires the flexible common electrode film 2, the flow barrier needs to be placed. FIGS. 11A and 11B show cross sectional views of the sealing agent 3 formed without providing the flow barrier 5. First, as shown in FIG. 11A, the sealing agent 3 is applied on the substrate 1. Then, the common electrode film 2 is placed thereon. However, the thermosetting resin, which has a low viscosity before hardening, is pulled by the capillary force between the substrate 1 and the common electrode film 2 as shown in FIG. 11B. Thus, the sealing agent 3 itself flows into the center of the sensor, and the device becomes defective. To solve this problem, the flow barrier 5 is provided inside the sealing agent 3 to prevent the occurrence of a capillary phenomenon so as to prevent the sealing agent 3 from entering inside.

Even if no capillary phenomenon occurs while the common electrode film 2 is fixed to the substrate, there is another problem. That is, while thermosetting resin is heated to be hardened, the solvent evaporates and generates gas. Some of the gas is sealed inside the surface pressure distribution sensor, and makes it difficult to control the air to be sealed, thereby causing variations in sensitivity, and at the worst, expanding the adhered region until the sensing becomes impossible. That is why the flow barrier 5 is applied and semi-hardened by pre-baking in the above process. The pre-baking before the lamination of the common electrode film 2 releases gas from the flow barrier 5 and prevents the gas released from the sealing agent 3 and the contact resin 6b from being sealed inside the sensor during the main baking conducted after the lamination of the common electrode film 2.

It is possible to reduce the generation of gas without providing the flow barrier 5. For example, a preliminary heat treatment on the sealing resin 3 may be performed, and then another heat treatment for full-hardening may be performed at the attaching of the common electrode film 2. However, the sealing agent must be low temperature thermosetting resin because the flexible insulator film of the common electrode film has a low heat resistance temperature. This causes the resin to be hardened too much in the first heat treatment, and to lose its affixing ability significantly during the heat treatment for full-hardening. This leads to a low yield or shortening of the life of the sensor. In this embodiment, on the other hand, there is no decrease in the affixing ability since the flow barrier 5 is pre-baked and a fresh sealing agent 3 is provided separately at the time of attaching the common electrode film 2. Furthermore, the sealing agent 3 can be applied up to the edges of the substrate 1 to secure a higher affixing strength.

The pre-baking for semi-harden the flow barrier 5 must be controlled so that the resin does not reach the full-hardening level. The reason for this is as follows. Full-hardening of the flow barrier 5 by pre-baking makes the flow barrier 5 inflexible when the common electrode film 2 is affixed. In this case, the gap G is determined by the height of the hardened resin of the flow barrier 5. During the fixing of the common electrode film 2, the height of the flow barrier 5 can be controlled only by the amount of resin to be applied thereto. Therefore, the flow barrier 5 must have a height in the semi-hardened stage of about the same as or lower than the finally predetermined gap G, which is 25 μm in this embodiment. However, when the flow barrier 5 is very low in height, it becomes impossible to suppress the occurrence of the capillary phenomenon. In this embodiment, however, since the flow barrier 5 is flexible, it may be formed higher than the gap G and then be pushed down at the time of attaching the common electrode film 2. Hence, by making the flow barrier 5 loose the fluidity but still maintain flexibility enough to be deformed by the application of pressure during the main baking, the gap G is determined by the diameter of the resin fibers, which fill the space between the substrate 1 and the common electrode film 2.

The material of the flow barrier 5 may be photosetting resin, resist, or any other material as long as it is not fluid and has some flexibility. However, it is preferable that the sealing agent 3 and the flow barrier 5 are both made of low temperature thermosetting resin. Using the same low temperature thermosetting resin makes the flow barrier 5 and the sealing agent 3 have an affinity for each other, and the same setting requirements enable the contact 6 and the sealing agent 3 to be hardened by one heating operation. In addition, the sealing agent 3 and the flow barrier 5 can be integrated. This enables the flow barrier 5 to function as part of the sealing agent 3 after the main baking, and the width for sealing to increase by 1.5 to 2 times, thereby improving the moisture resistance of the elements such as TFTs 4a formed on the substrate 1. Furthermore, if the flow barrier 5 deformed by the roller remained flexible after the main baking, the elasticity of the flow barrier 5 would function to peel off the common electrode film 2. However, full-hardening the flow barrier 5 by the main baking eliminates this problem, thereby improving the yield. In addition, the flow barrier 5 is full-hardened at the same time as the sealing agent 3, thereby eliminating the need for the process of hardening the flow barrier 5.

In addition, in the case of an LCD, the contact 6 is generally formed by using Ag paste. In this embodiment, the contact resin 6b was made by using Ag paste as an experiment only to find that the common electrode film 2 had conduction failures frequently. The reason for this is believed to be as follows. When the main baking is carried out for 30 minutes at 90° C. because PET and PEN of the base material of the common electrode film have glass transition temperatures of 67° C. and 113° C., respectively, the base material of the Ag paste is not full-hardened because its hardening temperature is 120° C., thereby causing the surface strength to be deteriorated. Therefore, in this embodiment, the contact resin 6b is made by mixing Au pearl into the same low temperature thermosetting resin as the one used for the sealing agent 3 and the flow barrier 5. Making the contact resin 6b also from the low temperature thermosetting resin can secure the hardening of the contact resin 6b, thereby offering a sufficient surface strength.

FIGS. 12A and 12B show a cross sectional views of the contact 6. These are cross sectional views taken along line B—B shown in FIG. 1. As shown in FIG. 12A, the contact 6 is placed inside the sealing agent 3 to prevent the contact 6 from contacting outside air, thereby preventing deterioration of the contact 6. Furthermore, the contact 6 is placed outside the flow barrier 5 to prevent the contact resin 6b from flowing into the sensor. Thus, the contact 6 is provided between the flow barrier 5 and the sealing agent 3.

Furthermore, placing the contact 6 inside the sealing agent 3 allows the conductive film 2b of the common electrode film 2 not to extend beyond the sealing agent 3 as shown in FIG. 12B. By eliminating the conductive film 2b in the position corresponding to the sealing agent 3 and fixing the exposed flexible insulator film 2a made of PET or PEN directly on the sealing agent 3, the common electrode film 2 is prevented from being removed from the substrate 1 due to the peeling off between the flexible insulator film 2a and the conductive film 2b, thereby further improving the reliability. Since the resin covers the contact pad 6a formed on the substrate 1, the contact pad 6a is not exposed and is protected against deterioration due to oxidation.

The following is a description of the use of the roller 51 for fixing the common electrode film 2, which is described with reference to FIG. 10. The roller 51 is preferably made of silicon resin, silicon, polycarbonate, ABS resin or the like, having a hardness (Hs; hardness spring) of 50 or higher, and most preferably 50 to 150. The roller 51 may also be made of a ceramic, a metal, a glass or the like having some hardness sufficient to perform accurate air control. A soft material having a hardness of less than 50 causes the roller 51 itself to be bent, making the air amount control inaccurate.

The pressure of the roller 51 is set at 100 g/cm$^2$ to 1000 g/cm$^2$, and the preferable speed of the roller 51 is 5 mm/s to 50 mm/s. In addition, the optimum tension of the common electrode film 2, when it is applied, is 100 g to 3000 g.

Figure 13:
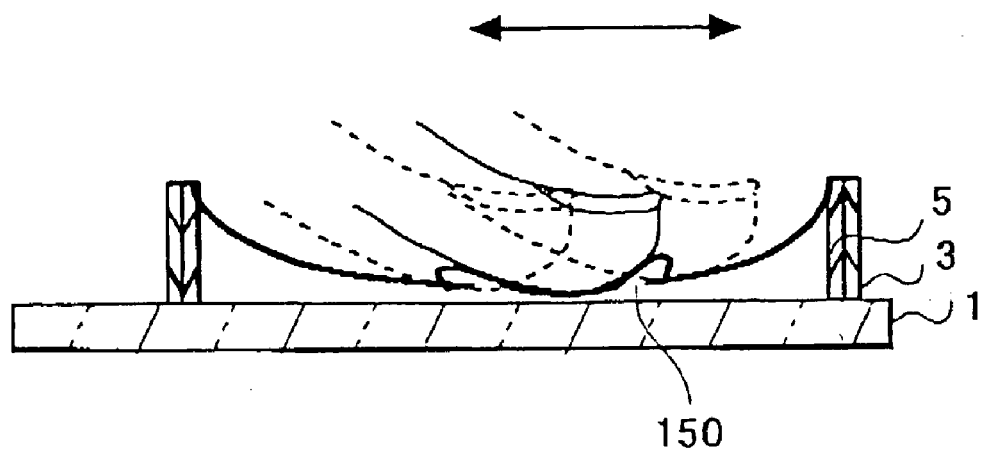
FIG. 13 is a cross sectional view to show a defect formation without a proper tension applied to the flexible conductive film.
Figure 14A:
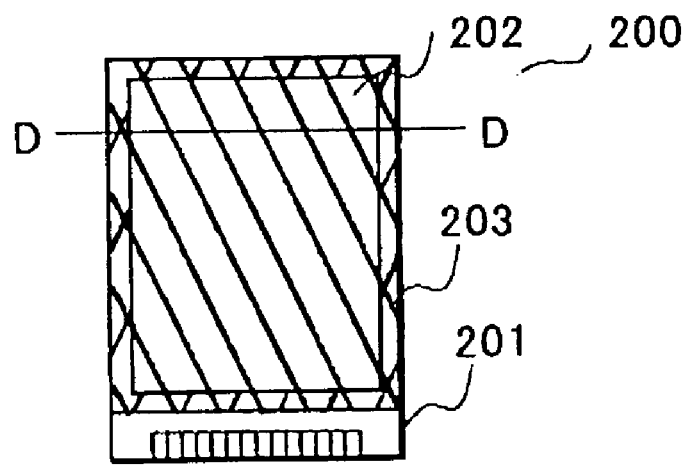
FIGS. 14A, 14B and 14C are cross sectional views to show a conventional surface pressure distribution sensor.
Figure 14B:
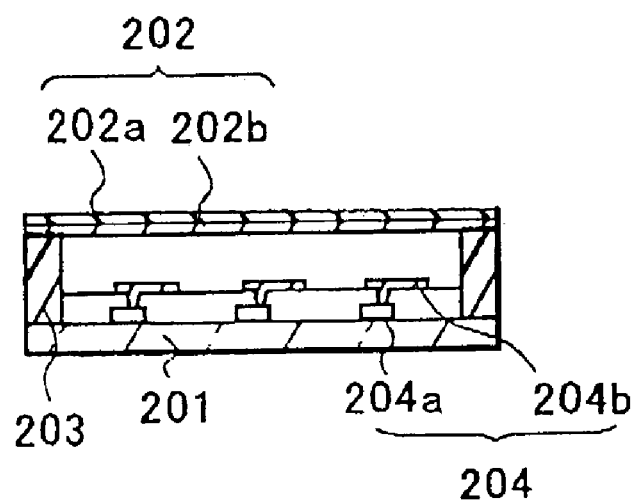
Figure 14C:
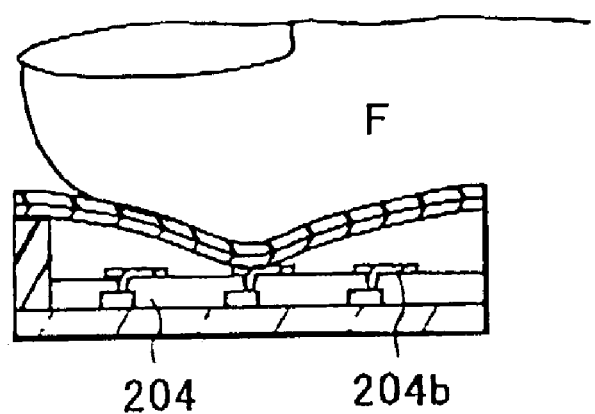

The common electrode film 2 requires the optimum tension in sensing. The common electrode film 2 has a flexibility and air is sealed in the device. As shown in FIG. 13, since the finger slides during the sensing, insufficient tension may cause unnecessary folding 150 on the common electrode film 2, making optimum sensing impossible. In this embodiment, the flexible conductive film (PEN or PET) fixed on the substrate undergoes heat treatment so as to be shrunk to obtain an optimum tension (hereinafter, this heat treatment is referred to as shrink-baking). The shrink-baking for shrinking the base material is carried out within a short time at temperatures higher than the glass transition temperature and lower than the softening point of the flexible insulator film 2a. The preferable temperatures is higher than the glass transition temperature by 10° C. to 20° C. For example, in the case of PEN and PET having glass transition temperatures of 113° C. and 80° C., respectively, the heat treatment is carried out for 3 minutes at temperatures 10° C. to 20° C. higher than these temperatures. The base material of the flexible insulator film 2a is shrunk by 1% to 3% after the shrink-baking so as to obtain an optimum tension, which does not cause unnecessary folding. The shrinking is best restricted to 2% or so because too much shrinking hardens the flexible conductive film 2.

Dry air without moisture or nitrogen gas may be filled between the common electrode film 2 and the substrate 1. If the air inside the sensor contains moisture, the TFTs 4a would be constantly exposed to this air. Accordingly, in this embodiment, nitrogen gas containing no moisture is sealed into the space created by the common electrode film 2, the substrate 1 and the sealing agent 3. This can prevent the TFTs 4a from deteriorating or having property shift due to moisture intake. The gas to be sealed into the space is not limited to nitrogen, and may be an inert gas that does not react with the components formed on the substrate 1 or the surface of the common electrode film 2. Dry air may be used because it can avoid entry of moisture into the TFTs 4a and does not accelerate relevant chemical reactions. In addition, ambient air may be sealed in the device without drying treatment of the air. Although it is also possible to use a gas containing so-called inert elements such as Ar, Ne and Kr, nitrogen is used in this embodiment to reduce cost.

As described above, the distance between the substrate and the flexible conductive film is 15 $\mu$m or larger, which reduces the variations in the amount of air sealed in the device and, thus, in sensing sensibility. This also prevents insufficient hardening of the sealing agent due to an excessively narrow gap. Accordingly, the production reliability is improved since the peeling off of the common electrode film and the entry of outside air into the sensor are prevented. Furthermore, in this configuration, the common electrode film does not adhere to the substrate during the attachment of the film to the substrate. Setting the distance between the substrate and the flexible conductive film at 40 $\mu$m or smaller prevents the sensor from containing too much air inside, which results in a decrease in the sensitivity.

Since the distance between the substrate and the flexible conductive film is determined by the diameter of the resin fibers, the glass fibers or the spherical spacers mixed into the sealing agent, the device can be manufactured with a precise separation distance control. A reduction in the error of the distance control results in a reduction of the amount of the defective devices produced.

What is claimed is:

1. A surface pressure distribution sensor comprising:
   a substrate;
   unit detection elements disposed on the substrate;
   a flexible conductive film disposed over the substrate so that a distance between the flexible conductive film and the substrate is between 15 $\mu$m and 40 $\mu$m;
   a sealing agent attaching the flexible conductive film to the substrate; and
   fibers or spherical spacers disposed in the sealing agent so that the distance between the flexible conductive film and the substrate is determined by a diameter of the fibers or the spherical spacers.

2. The surface pressure distribution sensor of claim 1 wherein the unit detection elements are disposed in a form of a matrix on the substrate, each of the unit detection elements includes a switching element and a contact electrode connected to the switching element, and the switching elements are configured to be sequentially turned on to detect a conduction between the contact electrodes and the flexible conductive film.

3. The surface pressure distribution sensor of claim 1 wherein the diameter of the fibers or the spherical spacers is between 15 $\mu$m and 40 $\mu$m.

4. The surface pressure distribution sensor of claim 1 wherein the fibers are made of a resin or a glass.

5. A surface pressure distribution sensor comprising:
   a substrate;
   unit detection elements disposed on the substrate;
   a flexible conductive film disposed over the substrate so that a distance between the flexible conductive film and the substrate is between 15 $\mu$m and 40 $\mu$m;
   a sealing agent attaching the flexible conductive film to the substrate;
   a flow barrier disposed on an inner side of the sealing agent with respect to the substrate; and
   a contact pad disposed on the inner side of the sealing agent.

6. The surface pressure distribution sensor claim 5 wherein the unit detection elements are disposed in a form of a matrix on the substrate, each of the switching element, and the switching elements are configured to be sequentially turned on to detect a conduction between the contact electrodes and the flexible conductive film.

7. A surface pressure distribution sensor comprising:
   a substrate;
   unit detection elements disposed on the substrate;
   a flexible conductive film disposed over the substrate;
   a sealing agent attaching the flexible conductive film to the substrate; and
   fibers or spherical spacers disposed in the sealing agent so that a distance between the flexible conductive film and the substrate is determined by a diameter of the fibers or the spherical spacers.

8. The surface pressure distribution sensor of claim 7 wherein the unit detention elements are disposed in a form of a matrix on the substrate, each of the unit detection elements includes a switching element and a contact electrode connected to the switching element, and the switching elements are configured to be sequentially turned on to detect a conduction between the contact electrodes and the flexible conductive film.

9. A surface pressure distribution sensor comprising:
   a substrate;
   unit detection elements disposed on the substrate;
   a flexible conductive film disposed over the substrate;
   a sealing agent attaching the flexible conductive film to the substrate;
   a flow barrier disposed on an inner side of the sealing agent with respect to the substrate; and
   a contact pad disposed on the inner side of the sealing agent.

10. The surface pressure distribution sensor of claim 9 wherein the unit detection elements are disposed in a form of a matrix on the substrate, each of the unit detection elements includes a switching element and a contact electrode connected to the switching element, and the switching elements are configured to be sequentially turned on to detect a conduction between the contact electrodes and the flexible conductive film.

* * * * *